United States Patent Office 2,746,302
Patented May 22, 1956

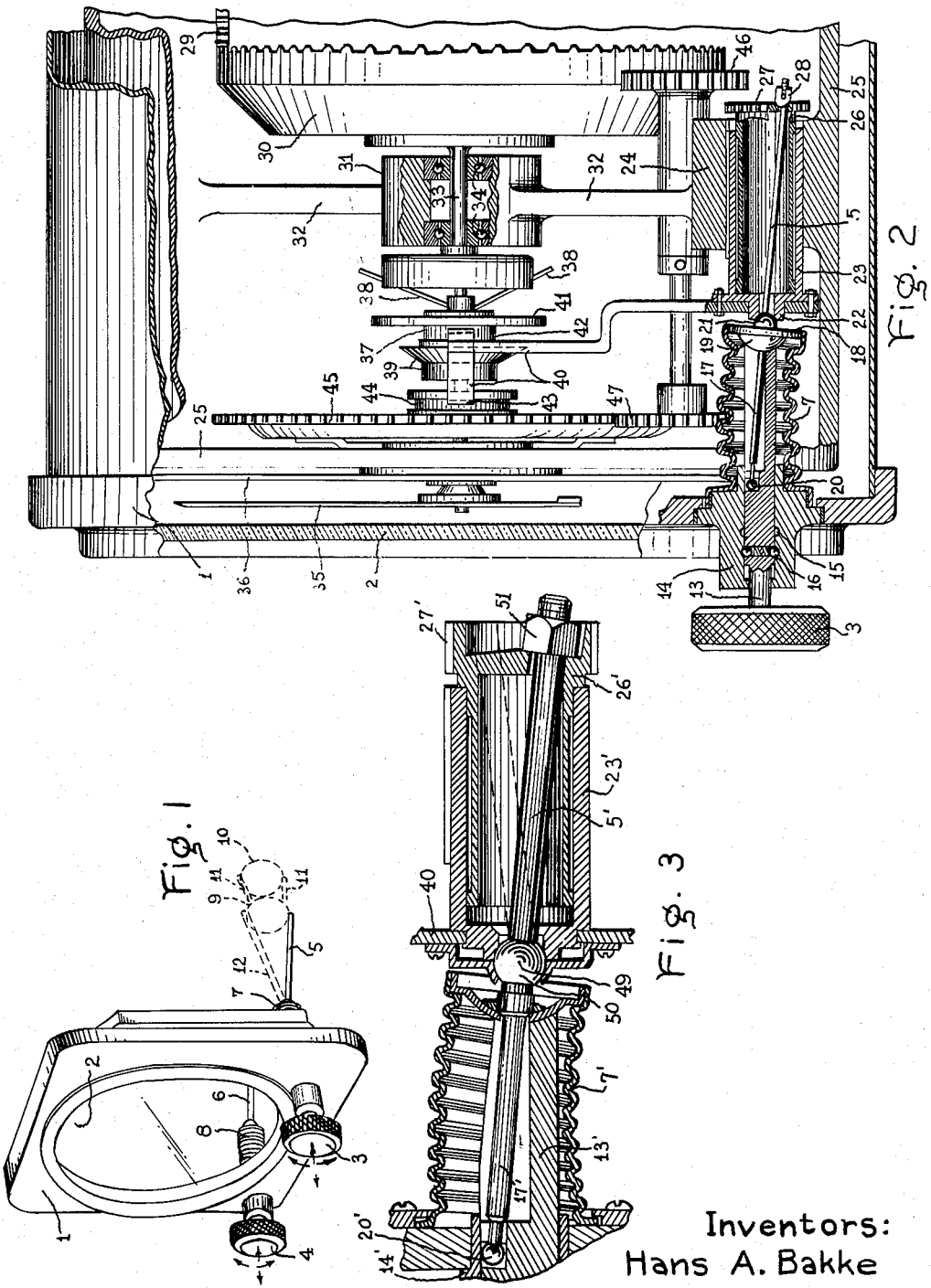

2,746,302

SEALED OPERATING MECHANISM

Hans A. Bakke, Swampscott, and Samuel Gabrielson, South Lynnfield, Mass., assignors to General Electric Company, a corporation of New York Application January 29, 1954, Serial No. 407,094

10 Claims. (Cl. 74—18.1)

The present invention relates to improved apparatus for translating linear and angular movements through hermetic seals, and, more particularly, to unique apparatus for manipulating the interior mechanisms of hermetically-sealed instruments.

In the transmission of rotary motion through moisture-proof seals, it has long been a common expedient to employ a flexible seal, such as a bellows or diaphragm, and a motion-transmitting shaft which is fixed to the flexible seal intermediate its ends and which wobbles such that its ends may both describe circles. While such a shaft does not itself rotate, one of its ends can be caused to move in a circular path by a rotating member, and the other end, which also moves in a circular path, can be caused to turn another rotatable member. Because the flexible seals prohibit passage of moisture or dirt, this type of rotary motion transmission system has been proposed for application in diverse equipment, including fluid pumps, valves, washing machines, refrigeration apparatus, and waterproof watches.

Precision instruments for aircraft are also required to be wholly impervious to moisture and dirt and are often partially evacuated or filled with inert gases to preserve sensitive components. Gyroscopic apparatus is particularly susceptible to disturbance or failure because of contaminations, and it is now common practice to seal gyroscopic instruments hermetically and to introduce an inert protective atmosphere such as helium. However, it will be understood by those skilled in the art that such instruments must often be set, caged, or adjusted, and that these operations must not destroy the sealed conditions. In accordance with the teachings of our invention, sealed instruments such as gyros may be constructed with improved actuating mechanism of the aforementioned type, and each such mechanism may perform dual functions enabled by both angular and linear movements.

One object of the present invention is to provide improved apparatus for the translation of linear and angular motions through hermetic seals.

A further object is to provide improved mechanisms for the accurate adjustment of fully sealed instruments.

By way of a summary account of one aspect of this invention, a sensitive direct-indicating directional gyroscope, which may have both an adjustable azimuth dial and azimuth pointer, and which is encased by a hermetically sealed housing, is adjusted by the manipulation of at least one knob projecting from its front flange. This adjusting knob is movable angularly and axially, the axial movement being effective to declutch the dial and pointer from the gyroscope mechanism and to engage gears which permit angular settings of the dial and pointer. Rotation of the knob effects the latter angular settings when the knob is in one of two permissible axial positions. A flexible and expansible metallic bellows seals the instrument housing at the position where the knob movements are communicated with the interior of the housing. The knob is provided with a shaft which causes expansion and contraction of the bellows and which turns the outer end of a wobble shaft sealed to the movable end of the bellows. Inside the instrument, the other end of the wobble shaft turns and slides a setting gear and, further, slides a clutch arm to engage and disengage the gyro mechanism and indicators.

Although the features of this invention which are believed to be novel are set forth in the appended claims, greater detail of preferred embodiments of the invention and the further objects and advantages thereof may be readily comprehended through reference to the following description taken in connection with the accompanying drawing, wherein:

Figure 1 is a pictorial representation of a front flange for a sealed instrument having actuating mechanism embodying teachings of this invention;

Figure 2 illustrates in section the indicating and adjusting mechanisms of a hermetically sealed directional gyroscope; and Figure 3 is a sectionalized view of a portion of an alternative sealed actuating assembly.

A typical front flange 1 for a hermetically sealed directional gyroscope instrument of the direct-indicating class is portrayed in Figure 1, the usual window glass 2 being present to afford a view of an azimuth dial and pointer. In addition, two manually actuatable knobs 3 and 4 are mounted in the flange to enable settings and adjustments of the gyro and indicator mechanisms. As is brought out in greater detail hereinafter, movements of these knobs are translated into corresponding movements of the actuating members 5 and 6 which are normally within the sealed instrument enclosure and sealed from the exterior by flexible and expansible metal bellows 7 and 8. The innermost ends of actuating members 5 and 6 describe circular paths, such as the dashed circular paths 9 and 10, when the corresponding knobs are rotated manually. Dashed lines 11 indicate the innermost or rearmost positions of actuating member 5 when its knob 3 is pushed fully inward toward the front flange, for purposes of comparison with the solid-line view and dashed-line view 12 of these parts in the fully retracted position. Knob 4 and its actuating member 6 are movable in the same manner.

In Figure 2 there are portrayed the further details of knob mechanisms and the other apparatus required for proper operation of our sealed actuating system, corresponding parts being assigned the same reference characters as those appearing in Figure 1. Knob 3 is shown to be attached to the outer end of a knob shaft 13 which is mounted in front flange bushing 14 for both longitudinal and rotative movements. Inasmuch as the preferred actuating arrangement entails a selective-positioning of the knob shaft at either of two distinct longitudinal positions, a longitudinal detent arrangement is provided, comprising annular indentations in bushing 14, such as those identified by numeral 15, and spring-biased balls 16 partially recessed in a diametric bore in the knob shaft. A longitudinal channel or slot running from the inner end of knob shaft 13 accommodates an oblique actuating arm 17 which lies therein and is fastened to a machined wobble plate 18 formed with a first spherically-shaped surface 19, the innermost end of knob shaft 13 having concave spherically-shaped surfaces which mate with surface 19 such that relative rotation between these surfaces is facilitated. Actuating arm 17 is shaped with a ball end 20, which is locked between shaft 13 and bushing 14 in a constricted slot in the knob shaft, this construction being one which preserves a tilt between the actuating arm and knob shaft and which locks the surface 19 in frictional engagement with the rearmost end surface of the knob shaft so that these surfaces cannot pull apart. Sealing bellows 7 is hermetically secured both to wobble plate 18 and to the bushing 14, the latter in turn being sealed into the gastight instrument enclosure as a part thereof. It should also be understood that plate 18 is fully sealed with actuating arm 17 so that no fluid leakage occurs through it.

The axis of actuating arm 17 extends straight through the center of wobble plate 18 and along the oblique actuating member 5, which is actually an extension of the actuating arm so positioned that it lies within the sealed enclosure. A second spherically-shaped surface 21 is formed rearwardly of wobble plate 18, the centers of the two surfaces 19 and 21 being common. This second surface engages a spherically-shaped depression in the end 22 of a hollow cylindrical sleeve 23 keyed to slide in a part 24 of the instrument casting 25 without rotating. A second hollow cylindrical sleeve 26 is positioned for rotation within the keyed sleeve 23 and is fixed to a setting gear 27 at its rearmost end. Actuating arm 5 passes through these sleeves and through gear 27, and is angularly locked to the gear 27 and longitudinally locked with sleeves 23 and 26 by a spherically-surfaced nut 28 mated in a corresponding depression in gear 27. This construction is one which greatly facilitates connection and disconnection of the actuating arm 5 and the sleeve and gear members, because the stop nut 28 is the sole adjustable locking element. Also, the concentric sleeves 23 and 26 are held in proper longitudinal relationship between the adjustable stop nut and surface 21 at the two ends of actuating arm 5.

In most sealed actuating devices of the general character of that of the present invention, the actuating arm is either so curved or so pivoted that the sealing bellows is greatly distorted when the actuating arm moves in a circular path just at the point where that arm passes through the seal. This effect is evidenced by a pronounced curvature occasioned by lateral displacement of the ends of the longitudinal axis of the bellows. One of the advantages of our mechanism is that the center of the circular wobble plate 18 does not describe a large circle but, instead, remains substantially fixed while the plate wobbles about that center. This result obtains because the center of wobble plate 18 is very close to the center point about which the actuating arm nutates, and portions of the folds of bellows 7 are mainly compressed and expanded as this nutation occurs, with the ends of the longitudinal axis of the bellows remaining substantially along the same straight line rather than being displaced. It can be readily appreciated that this reduction of bellows distortions safeguards the delicate soldered seals with which the bellows is joined with other parts and lessens the likelihood of ruptures in the thin-walled bellows itself. Further, our preferred embodiment involves an adjustable expansion and contraction of sealed bellows, depending upon the adjustable longitudinal position of the actuating knob and actuating arm, and the addition of other distortions, such as those attending a large curvature of the bellows axis, would be highly undesirable.

The present sealed adjustment apparatus is particularly advantageous in its association with a direct-indicating directional gyroscope such as that illustrated in Figure 2, instruments of that nature being very frequently demanding of manipulation of their indicating mechanisms. Our copending application Serial No. 386,488, filed October 16, 1953, for "Gyro Setting Arrangement," assigned to the same assignee as that of the instant application, discloses directional gyroscopes having indicating assemblies of this construction. Briefly stated here, the conventional gyroscope proper (not shown) includes a high-inertia gyro rotor structure with a spin axis normal to the horizontal minor axis about which it is pivoted in a main gimbal and also normal to the vertical major axis about which the main gimbal is pivoted in the instrument casting 25. The usual gimbal gear 29, shown in part, is attached to the main gimbal in a driving meshed relationship with the customary unity-ratio cup-gear 30 which is revolubly supported by bearings in a hub 31 fixed with frame casting 25 by spacers 32. Cup-gear shaft 33 thus rotates in hub bearings 34 by angular amounts equal to the angular movements of the outer frame casting 25 in relation to the main gimbal gear 29, which gear is rigidly preserved in a set azimuth orientation by the gyroscopic inertia of the gyro rotor structure.

The front-end adjustable indicating mechanism of the instrument translates the angular orientations of the gyro output shaft 33 into angular orientations of the azimuth pointer 35 which is read against azimuth indicia appearing on dial 36. Bearing support for the dial and pointer is provided in the casting 25. As our aforementioned copending application points out in some detail, the dial and pointer may be completely severed from the gyro output shaft 33, during those times when the dial and pointer are to be set or adjusted, by pressing the magnetic clutch member 37 rearwardly against the force of the wire springs 38. Springs 38 angularly couple the clutch member 37 with the gyro shaft 33, and the rearward movement of member 37 takes this member out of contact with the permanently magnetized clutch member 39 which is directly connected with and drives azimuth pointer 35. Thus, the pointer 35 may be set angularly without reflecting torques upon the gyro output shaft 33. Knob 3 may cause the pointer 35 to be set angularly only in synchronism with the dial 36, although ordinarily a second knob, such as 4 (Figure 1), will be effective to cause rotation of the pointer alone. Magnetic clutch member 37 is thrust out of engagement with the magnetized clutch member 39 by a bifurcated member or yoke 40 which may be moved rearwardly against the clutch throwout plate 41 having a low-friction mounting on magnetic clutch member 37. At the same time that the end 42 of yoke 40 pushes the throwout plate 37 rearwardly, the other yoke end 43 slides the magnetic dial clutch member 44 rearwardly into engagement with the magnetized clutch member 39. Clutch member 44 is angularly keyed with dial gear 45, but is axially slidable under the influence of yoke end or finger 43. Accordingly, rearward movement of yoke 40 declutches the gyro output shaft 33 from the pointer and causes the pointer and dial to become clutched. Dial gear 45 is angularly adjusted by the rotation of frame-mounted setting gear 46 which, in turn, rotates the gear 47 permanently enmeshed wtih the dial gear.

Movements of the dial gear thus accomplish corresponding movements of both the dial 36 and pointer 35. It will be perceived that, because of the mounting of yoke 40 on the slidable sleeve 23, longitudinal movements of knob 3 will move the yoke to cause the aforementioned clutching and declutching. Also, inasmuch as the actuating gear 27 is positioned for movement into and out of mesh with setting gear 46 depending upon the longitudinal position of knob 3, i is merely necessary to press knob 3 fully to the rear and then rotate it to set the dial and pointer in azimuth.

In the fully retracted position pictured in Figure 2, the sealed actuating assembly does not cause rotation of the dial and pointer, but simply permits the gyro to be coupled with the azimuth pointer and prevents the dial from being clutched with the pointer. Yoke 40 there holds dial clutch member 44 out of engagement with the pointer clutch member 39 because the yoke is fixed onto the keyed outer sleeve 23 which is longitudinally positioned by inner sleeve 26, stop nut 28, actuating arm portions 5 and 17, knob shaft 13, and the knob shaft detenting arrangement. Ball end 20 of actuating shaft 17, being seated in a retaining slot in the knob shaft 13, preserves the illustrated relationship between the actuating arm and knob shaft. Were it not for this seating or locking, the bellows 7 would be stretched and seals might be broken when the knob is pulled out.

Rotation of knob 3 and its shaft 13 results in a circular motion of the ball end 20 of actuating arm 17. This crank arm does not rotate about its own axis, nor does the wobble plate 18, which is angularly fixed with the sealing bellows 7. Wobble motions of plate 18 take place about the center of the spherical surfaces 19 and 21, and the seating of these surfaces in accommodating recesses in the ends of knob shaft 13 and sleeve 23, respectively, insures that the actuating arm and bellows cannot be displaced laterally from their proper positions. As actuating arm end 20 describes a circular path, the opposite end of the actuating arm portion 5 also describes a circular path, carrying the rotatable gear 27 and sleeve 26 around with it. During such times, the outer keyed sleeve 22 remains fixed angularly, and thus the position of yoke arm 40 is undisturbed.

When knob 3 is pushed in, its shaft 13 forces wobble plate 18 to the rear also, and surface 21 simultaneously pushes the keyed sleeve 22, sleeve 23, and yoke 40 backward. Knob shaft 13 and wobble plate 18 bear the full load as this movement takes place, the actuating arm arrangement being isolated insofar as these loading forces are concerned. Once gear 27 has been moved back far enough to mesh with setting gear 46, rotation of knob 3 will occasion rotation of the dial and pointer in the manner earlier described. Forward and rearward movements of the sealed actuating mechanism may also cause a signal flag to move into and out of view, respectively, through the window glass 2, the numerous possible designs of such a signalling apparatus being within the skills of one versed in this art.

An alternative embodiment embracing our invention appears in Figure 3, wherein, for convenience, those elements corresponding to parts shown in Figure 2 are identified by the same reference characters, having prime accent marks. In that embodiment, a sheet stamping 48 serves the functions of a wobble plate, the actuating arm 17' being brazed or otherwise sealed with it, and the stamping itself having a spherically-shaped portion which is mated in the corresponding depression in the end of the knob shaft 13'. The center of curvature of the stamping 48 and the knob shaft end is also the center 49 of the ball portion 50 of the actuating arm, the nutations of the crank arm occurring about that center point. Locking nut 51 near the end of actuating member 5' is of the conventional flat-ended type, resting against a sloped surface 52 on sleeve 26' such that binding does not occur when gear 27' rotates in relation to the member 5'.

While particular embodiments of our invention have been shown and described herein, it will occur to those skilled in the art that various changes, modifications and substitutions may be effected without departing either in spirit or scope from this invention in its broadest aspects.

What we claim as new and desire to secure by Letters Patent of the United States is:

1. A sealed motion translating arrangement comprising a fluid-tight instrument enclosure having an aperture therethrough, a flexible open-ended bellows having one end sealed with said enclosure about said aperture, a wobble plate sealed with said bellows at the other open end thereof and having a substantially spherical convex surface thereon disposed toward the outside of said enclosure, a radially-slotted rotatable shaft mounted outside the sealed portion of said enclosure and having one end recessed with a substantially spherical concave surface disposed in a mating relationship with said surface of said plate, said substantially spherical surfaces having the same center of curvature, a substantially straight actuating arm extending through said wobble plate and said center of curvature, and means positioning one end of said actuating arm in the slot in said slotted shaft with its longitudinal axis oblique in relation to the longitudinal axis of said shaft, said actuating arm and said shaft being relatively rotatable.

2. A sealed motion translating arrangement comprising a fluid-tight enclosure having an aperture therethrough, a substantially cylindrical flexible bellows projecting into said enclosure and having one open end sealed with said enclosure about said aperture, a substantially circular member sealing the other open end of said bellows, a substantially linear actuating arm sealed with and extending through the center of said member, a slotted rotatable shaft mounted outside of the sealed portion of said enclosure and projecting into said bellows, said shaft being slotted radially to accommodate the part of said actuating arm outside the sealed portion of said enclosure, mating substantially spherical surfaces one on one end of said shaft and the other fixed in relation to said bellows sealing member, said surfaces having the same center of curvature, and means positioning said part of said actuating arm in the slot in said shaft with its longitudinal axis oblique in relation to the longitudinal axis of said shaft, said actuating arm and said shaft being relatively rotatable.

3. A sealed motion translating arrangement comprising a fluid-tight instrument enclosure having an aperture therethrough, a flexible bellows having one open end sealed with said enclosure about said aperture, a member sealing the other open end of said bellows, a rotatable shaft, said sealing member and one end of said shaft having mating substantially spherical surface portions having the same center of curvature, a substantially linear actuating arm fixedly sealed with and extending through said sealing member, and means positioning said actuating arm with its longitudinal axis oblique in relation to the longitudinal axis of said shaft and with one end of said arm angularly fixed in relation to said longitudinal axis of said shaft.

4. A sealed motion translating arrangement comprising a fluid-tight enclosure having an aperture therethrough, a flexible bellows having one open end sealed with said enclosure about said aperture, a member sealing the other open end of said bellows, a rotatable shaft, said sealing member and one end of said shaft having mating substantially spherical surface portions having the same center of curvature lying along the longitudinal axis of said shaft, a substantially linear actuating arm fixedly sealed with and extending through said sealing member and said center of curvature, and means coupling one end of said actuating arm with said shaft at a fixed radial distance from and at a fixed angular relationship with said longitudinal axis of said shaft.

5. A sealed motion translating arrangement comprising a fluid-tight enclosure having an aperture therethrough, a flexible bellows having one end sealed with said enclosure about said aperture, a member sealing the other end of said bellows and having a substantially spherical surface portion, a shaped rotatable shaft having a substantially spherical surface portion on one end thereof, said surface portions having the same center of curvature and being in mating engagement, a substantially linear actuating arm sealed with and extending through said member and said center of curvature and having an enlarged end, said shaped rotatable shaft having a constricted opening near the surface thereof disposed to receive and hold said enlarged actuating arm both angularly and longitudinally about the longitudinal axis of said shaft and further having a substantially radial slot running from said opening to said one end of said shaft to receive said actuating arm in an oblique relation to said shaft axis, bushing means supporting said shaft for both longitudinal and angular movements about said shaft axis, and knob means for moving said shaft.

6. A sealed motion translating arrangement comprising a fluid-tight enclosure having an aperture therethrough, a flexible bellows having one end sealed with said enclosure about said aperture, a member sealing the other end of said bellows and having a substantially spherical surface portion, a shaped rotatable shaft outside said fluid-tight enclosure and having a substantially spherical portion on one end thereof in mating engagement with said spherical portion of said member, said spherical portions having the same center of curvature lying along the longitudinal axis of said shaft, a substantially linear actuating arm sealed with said member and having parts extending one from each side of said member, said actuating arm being disposed to pass through said center of curvature, means locking one of said actuating arm parts in a fixed oblique relation to said longitudinal axis of said shaft, said shaped shaft having an opening shaped to accommodate said actuating arm in said oblique relationship therewith, knob means for moving said shaft longitudinally and angularly about said shaft axis, a fixed support within said enclosure, an actuating gear mounted within said enclosure and on said support for longitudinal movement along and rotation about a gear axis collinear with said shaft axis, and means coupling the other part of said actuating arm with said gear eccentrically about said gear axis.

7. A sealed motion translating arrangement comprising a fluid-tight instrument enclosure having an aperture therethrough, a flexible bellows having one end sealed with said enclosure about said aperture, a member sealing the other end of said bellows and having a substantially spherical surface portion, a shaped rotatable and slidable shaft outside said fluid-tight enclosure and having a substantially spherical portion on one end thereof in mating engagement with said spherical portion of said member, said spherical portions having the same center of curvature lying substantially along the longitudinal axis of said shaft, a substantially linear actuating arm angularly fixed and sealed with said member and having parts extending one from each side of said member, said actuating arm being disposed to pass through said center of curvature, means fixing said actuating arm in an oblique relation to the longitudinal axis of said shaft, said shaped shaft having an opening at said one end thereof to accommodate said actuating arm in said oblique relationship therewith, a fixed support within said enclosure, a first instrument actuating member within said enclosure and mounted on said support for sliding movement along and angular movement about a support axis collinear with said shaft axis, means coupling the other part of said actuating arm with said actuating member eccentrically in relation to said support axis, and a second instrument actuating member slidably mounted within said enclosure on said support for sliding movement with said other part of said actuating arm.

8. A sealed motion translating arrangement comprising a sealed instrument enclosure having an aperture therethrough, a flexible bellows having one end sealed with said enclosure about said aperture, a member sealing the other end of said bellows and having a substantially spherical surface portion, a shaped rotatable shaft outside said sealed enclosure and having a substantially spherical portion on one end thereof in mating engagement with said spherical portion of said member, said spherical portions having the same center of curvature lying substantially along the longitudinal axis of said shaft, a substantially linear actuating arm angularly fixed and sealed with said member and having parts extending one from each side of said member, said actuating arm being disposed to pass through said center of curvature, means fixing said actuating arm in an oblique relation to the longitudinal axis of said shaft, said shaped shaft having an opening at said one end thereof to accommodate said actuating arm in said oblique relationship therewith, a fixed support within said enclosure, and means pivoting said actuating arm on said fixed support about said center of curvature to preclude lateral displacement of said center of curvature in relation to said shaft axis.

9. A sealed motion translating arrangement comprising a sealed instrument enclosure having an aperture therethrough, a flexible bellows having one end sealed with said enclosure about said aperture, a substantially linear actuating arm, first means fixed with said actuating arm and providing a first substantially spherical surface, and second means fixed with said actuating arm and providing a second substantially spherical surface, said surfaces having substantially the same center of curvature along the axis of said actuating arm, means angularly fixing and sealing the other end of said bellows with said arm such that said first surface is disposed outside and said second surface is disposed inside said enclosure, a shaped rotatable shaft having a substantially spherical surface portion on one end thereof in mating engagement with and having the same center of curvature as one of said spherical surface means, a support having a substantially spherical surface portion in mating engagement with and having the same center of curvature as the other of said spherical surface means, and means fixing said actuating arm in an oblique relation to the longitudinal axis of said shaft, said shaped shaft having an opening to accommodate said actuating arm in said oblique relationship therewith.

10. A sealed motion translating arrangement comprising a sealed instrument enclosure having an aperture therethrough, a flexible bellows having one end sealed with said enclosure about said aperture, a member sealing the other end of said bellows and having a substantially spherical surface portion, a shaped rotatable shaft outside said sealed enclosure and having a substantially spherical portion on one end thereof in mating engagement with said spherical portion of said member, said spherical portions having the same center of curvature lying along the longitudinal axis of said shaft, a substantially linear actuating arm angularly fixed and sealed with said member and having parts extending one from each side of said member, said actuating arm being disposed to pass through said center of curvature, means fixing said actuating arm in an oblique relation to the longitudinal axis of said shaft, said shaped shaft having an opening at said one end thereof to accommodate said actuating arm in said oblique relationship therewith, an instrument adjustment gear fixed for rotation within said enclosure, a fixed support within said enclosure, an actuating gear mounted on said support for rotation about and sliding movement into and out of engagement with said adjustment gear along a gear axis collinear with said shaft axis, and angularly fixed pivot means slidable in said support along said gear axis and pivotally supporting said actuating arm about substantially said center of curvature to preclude lateral displacement of said center of curvature from said shaft axis.

References Cited in the file of this patent

UNITED STATES PATENTS

| | | |
|---|---|---|
| 1,378,118 | Jacobsen | May 17, 1921 |
| 1,702,762 | Brubaker | Feb. 19, 1929 |
| 2,454,340 | Reichel | Nov. 23, 1948 |
| 2,610,410 | L'Abee-Lund | Sept. 16, 1952 |